(12) United States Patent
Hanson et al.

(10) Patent No.: US 9,326,437 B2
(45) Date of Patent: May 3, 2016

(54) ERGONOMIC SECOND-HANDLE FOR TOOLS

(71) Applicant: Kreger-Hanson, Inc., White Bear Lake, MN (US)

(72) Inventors: Brian Hanson, White Bear Lake, MN (US); Geoffrey Hanson, White Bear Lake, MN (US)

(73) Assignee: KREGER-HANSON, INC., White Bear Lake, MN (US)

( * ) Notice: Subject to any disclaimer, the term of this patent is extended or adjusted under 35 U.S.C. 154(b) by 0 days.

(21) Appl. No.: 14/593,258

(22) Filed: Jan. 9, 2015

(65) Prior Publication Data

US 2015/0216099 A1    Aug. 6, 2015

Related U.S. Application Data

(60) Provisional application No. 61/965,760, filed on Feb. 6, 2014.

(51) Int. Cl.

| | | |
|---|---|---|
| *A01B 1/02* | (2006.01) | |
| *A01B 1/22* | (2006.01) | |
| *E01H 5/02* | (2006.01) | |
| *A01D 9/00* | (2006.01) | |
| *B25G 1/00* | (2006.01) | |
| *B25G 1/04* | (2006.01) | |
| *B25G 1/10* | (2006.01) | |

(52) U.S. Cl.
CPC . *A01B 1/026* (2013.01); *A01D 9/00* (2013.01); *B25G 1/00* (2013.01); *B25G 1/04* (2013.01); *B25G 1/102* (2013.01); *E01H 5/02* (2013.01); *Y10T 16/4713* (2015.01)

(58) Field of Classification Search
CPC .............. E01H 5/02; B25G 3/02; B25G 1/00; B25G 1/04; B25G 1/102; A01B 1/026; A01B 1/02; A45C 13/26; A45C 13/262; A45C 13/22; A46B 7/04; B25F 5/026; A01D 9/00; Y10T 16/4713
USPC .......................................................... 294/58
See application file for complete search history.

(56) References Cited

U.S. PATENT DOCUMENTS

| | | |
|---|---|---|
| 344,890 A | 7/1886 | Wilson |
| 715,056 A | 8/1902 | Gruner |
| 933,647 A | 4/1909 | Hunt |
| 1,268,734 A | 6/1918 | Lay |
| 1,427,865 A | 11/1921 | Szabo |
| 1,431,389 A | 10/1922 | Frisz |
| 2,244,585 A | 12/1939 | Tweit |
| 2,221,219 A | 11/1940 | Nelson |

(Continued)

FOREIGN PATENT DOCUMENTS

CA          2154398 A1      3/1997

*Primary Examiner* — Stephen Vu
(74) *Attorney, Agent, or Firm* — Hamre, Schumann, Mueller & Larson, P.C.

(57) ABSTRACT

A shovel and ergonomic second-handle for a shovel are disclosed. The shovel includes a scoop; a shaft having first and second end portions, the first end portion being secured to the scoop; a main handle at the second end portion of the shaft; and a second handle positioned relatively closer to the first end portion of the shaft than to the second end portion of the shaft, the second handle including a grip, and the second handle being positioned such that a line extending through a longitudinal axis of the grip intersects the shaft. The grip is disposed at an angle θ relative to the shaft.

5 Claims, 7 Drawing Sheets

(56) References Cited

U.S. PATENT DOCUMENTS

| | | | |
|---|---|---|---|
| 2,521,441 A | 4/1948 | Bickley | |
| 2,772,910 A | 5/1953 | Doyle | |
| 2,769,612 A | 10/1956 | Weisheit | |
| 3,082,554 A | 3/1963 | Steeb | |
| 3,155,414 A | 11/1964 | Bales | |
| 3,222,699 A | 12/1965 | Zeisig | |
| 3,226,149 A | 12/1965 | McJohnson | |
| 3,751,094 A * | 8/1973 | Bohler | 294/58 |
| 3,773,375 A | 11/1973 | Nehls | |
| 4,050,728 A | 9/1977 | Davidson | |
| 4,155,582 A | 5/1979 | Reisner | |
| 4,200,324 A | 4/1980 | Helton | |
| 4,565,398 A | 1/1986 | Poulin | |
| 4,615,553 A | 10/1986 | Hultine | |
| 4,701,142 A * | 10/1987 | Merritt | 440/101 |
| 4,704,758 A | 11/1987 | Hoffman | |
| 4,787,661 A | 11/1988 | Rutledge | |
| 4,793,645 A | 12/1988 | Decker | |
| 4,794,667 A | 1/1989 | Nelson | |
| 4,944,541 A | 7/1990 | Waldschmidt | |
| 4,985,961 A | 1/1991 | Kegley | |
| 4,991,575 A | 2/1991 | Fitz | |
| 5,054,830 A | 10/1991 | Nisenbaum | |
| 5,060,343 A | 10/1991 | Nisenbaum | |
| 5,065,475 A * | 11/1991 | Watt | 16/426 |
| 5,133,582 A | 7/1992 | Rocha | |
| 5,159,769 A | 11/1992 | Odorisio | |
| 5,331,720 A * | 7/1994 | Beckingham | 16/426 |
| 5,400,471 A * | 3/1995 | Lichfield et al. | 16/426 |
| 5,431,468 A | 7/1995 | Rosenshine | |
| 5,447,349 A | 9/1995 | Coble | |
| 5,451,085 A | 9/1995 | Wagner | |
| 5,472,252 A | 12/1995 | Barone | |
| 5,486,027 A * | 1/1996 | Dionne et al. | 294/51 |
| 5,487,577 A | 1/1996 | Ball | |
| 5,496,085 A | 3/1996 | Middleton | |
| 5,499,852 A | 3/1996 | Seigendall | |
| 5,533,768 A | 7/1996 | Mitchell | |
| 5,606,772 A | 3/1997 | Ilic | |
| 5,645,305 A | 7/1997 | Lispi | |
| 5,695,231 A * | 12/1997 | Hoffman | 294/58 |
| 5,704,672 A | 1/1998 | Sims | |
| 5,871,246 A | 2/1999 | Simdom | |
| 5,921,600 A | 7/1999 | Lucas | |
| 6,062,619 A | 5/2000 | Clark | |
| 6,155,620 A | 12/2000 | Armstrong | |
| 6,203,081 B1 | 3/2001 | Kegan | |
| 6,283,522 B1 | 9/2001 | Renaud | |
| 6,704,968 B2 | 3/2004 | Lau | |
| 7,032,942 B2 | 4/2006 | Stuart | |
| 7,300,081 B1 | 11/2007 | Murray | |
| 7,866,720 B2 | 1/2011 | Haws | |
| 7,971,914 B1 | 7/2011 | Pladson | |
| 8,177,272 B2 | 5/2012 | Schinella | |
| 8,381,358 B1 | 2/2013 | Frey | |
| 8,511,209 B1 | 8/2013 | Bishop | |
| 8,740,272 B2 | 6/2014 | Walden | |
| 2002/0109364 A1 * | 8/2002 | Graves | 294/58 |
| 2003/0057721 A1 | 3/2003 | Ducklow | |
| 2011/0173778 A1 | 7/2011 | Wales | |
| 2012/0192540 A1 | 8/2012 | Macyszyn | |
| 2014/0132015 A1 | 5/2014 | Stacholoski | |

* cited by examiner

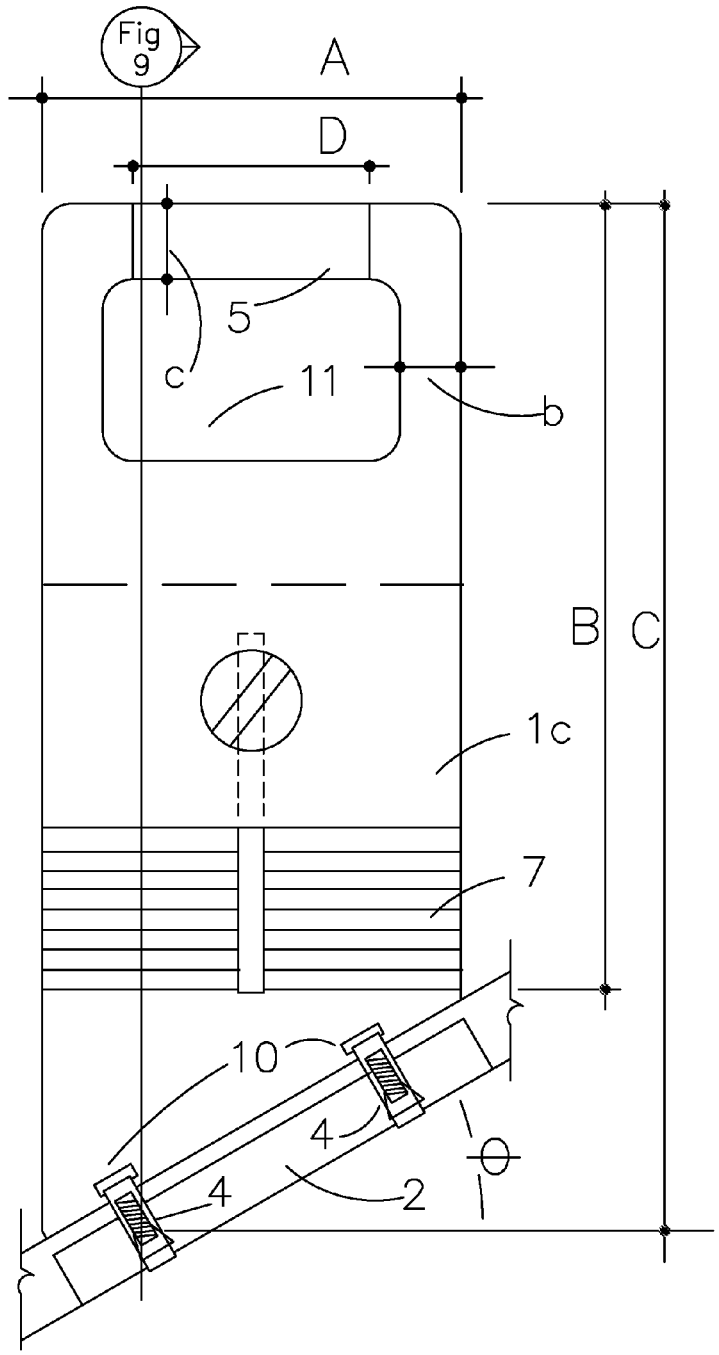
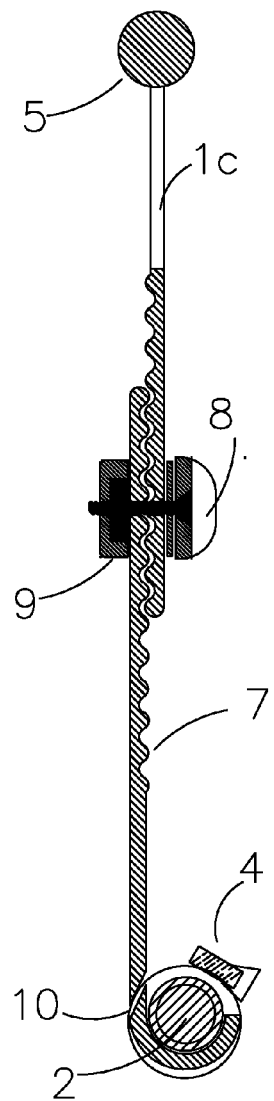
Fig. 8
Fig. 9

ERGONOMIC SECOND-HANDLE FOR TOOLS

BACKGROUND

Designers of shovels and handles for shovels often attempt to design a more ergonomic tool. For example, U.S. Pat. No. 8,177,272 includes a bent shaft as one means to be "ergonomic." In practice, this has little effect on the ergonomics or ease of use. Second-handle designs often include a secondary handle positioned perpendicular to a shaft of the shovel. In this odd perpendicular orientation, the lifter uses their weaker muscles on the top side of the forearm and thus cannot easily lift heavy weight. U.S. Publication No. 2014/0132015 describes an "ergonomic" bent shaft that is designed to be ganged between two shovels to make a plow, thus not making it easier to lift. U.S. Pat. No. 5,606,772 describes a new "ergonomic" handle grip for controlling long tools. This grip allows for pointing the shaft but it does not make lifting loads any easier, and perhaps more difficult. U.S. Pat. No. 7,032, 942 describes use of a cord from a scoop of the shovel to make the shovel more ergonomic. This does not allow for easy control of the direction-of-disposal of the scoop contents. Further, the handle is not fixed in the proper orientation for a better ergonomic design. U.S. Pat. No. 5,645,305 describes placing a second handle closest to the load to increase leverage. This placement makes it harder on the user's back and knees, as they still have to reach lower and bend down to pick up the loaded shovel. Thus there is a continuing need for an ergonomic second-handle for tools such as shovels.

SUMMARY

In one embodiment, an ergonomic second-handle for shovels can include an essentially flat/single-planar device located vertically above a shaft and close to/adjacent to a scoop of a shovel.

In one embodiment, the ergonomic second-handle includes second and third grips in the same direction as the shaft and located above the edge of the load/scoop for ergonomic lifting. In one embodiment, the ergonomic second-handle can make it easier to lift the loaded scoop by using less back muscles and more Bicep Brachii (inside upper arm) and Palmaris Longus (bottom forearm) muscles.

In one embodiment, the ergonomic second-handle can be connected to the shaft by a multi-point connection. The multi-point connection can include, for example, two hose-type clamps with thumb turns or other similar fixing device for quick and simple rotating of the ergonomic second-handle into a storage position parallel with a blade of the scoop. In one embodiment, the ergonomic second-handle can provide better control of the shovel.

In one embodiment, the shovel is a snow shovel.

A shovel is disclosed. The shovel includes a scoop; a shaft having first and second end portions, the first end portion being secured to the scoop; a main handle at the second end portion of the shaft; and a second handle positioned relatively closer to the first end portion of the shaft than to the second end portion of the shaft, the second handle including a grip, and the second handle being positioned such that a line extending through a longitudinal axis of the grip intersects the shaft. The grip is disposed at an angle θ relative to the shaft.

A tool is disclosed. The tool includes a utensil; a shaft having first and second ends, the first end being secured to the utensil; and a handle positioned closer to the first end of the shaft than the second end such that the handle is disposed near the utensil, the handle being positioned such that a handle plane bisecting the handle is parallel to a shaft plane extending through a longitudinal axis of the shaft and perpendicular to the utensil when the handle is in a working configuration. The handle includes a grip disposed at an angle θ relative to the shaft, and a connection mechanism detachably securing the handle to the shaft.

In one embodiment, the tool is a pitchfork. In another embodiment, the tool is a shovel. In yet another embodiment, the tool is a snow shovel.

A handle configured to be detachably connected to a handle shaft of a tool having a utensil is disclosed. The handle includes a first edge having a first length; a second edge having a second length, the second length being different than the first length; a connection edge configured to be detachably connected to the handle shaft; and a top edge extending from at least one of the first and second edges, wherein the handle includes an opening between the top edge and the connection edge such that the top edge is graspable. In an installed configuration the first edge is disposed relatively closer to the utensil of the tool than the second edge and the second edge is longitudinally spaced from the first edge in a direction of a longitudinal axis of the handle shaft, the connection edge is connected to the handle shaft, and a line extending along the top edge intersects the handle shaft at an angle θ.

BRIEF DESCRIPTION OF THE DRAWINGS

References are made to the accompanying drawings that form a part of this disclosure, and which illustrate the embodiments in which the systems and methods described in this specification can be practiced.

FIG. 8 shows a profile, side-view of an ergonomic second-handle according to another embodiment.

FIG. 9 shows a sectional view of the ergonomic second-handle of FIG. 8, according to one embodiment.

Like reference numbers represent like parts throughout.

DETAILED DESCRIPTION

Figure 1:
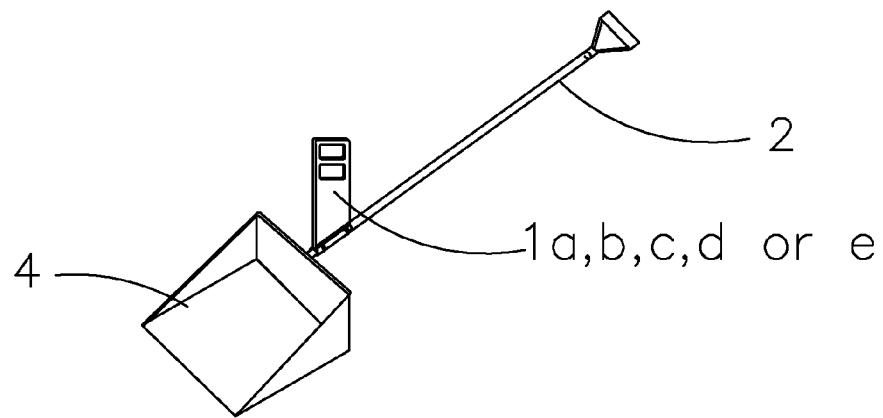
FIG. 1 shows an isometric view of an ergonomic second-handle attached to a shovel shaft, according to one embodiment.

This disclosure is directed to an ergonomic second-handle for a shovel, or similar shafted tool having a utensil, designed to reduce back strain when lifting loaded shovels of snow or other materials. This ergonomic second-handle device incorporates one or two grasping areas (11) in-line with the shaft and located just above the tool/shovel's connection to the shaft reducing the need to bend down, when lifting the loaded scoop/utensil up to dispose of its contents. The multi-point, rigid connection of this second-handle acts as one with the shovel/tool, to allow the user to control the direction of disposal of the loaded scoop/utensil. This new device incorporates the use of hose-type clamps, or similar device, allowing the user to rotate the second-handle, when storing the shovel.

Ergonomic design has been attempted with shovels and shovel add-ons for many years. By definition "ergonomic" means an object or system that has been designed to accommodate the needs and comfort of the user. Previous "ergonomic" shovels have not been effective to make it easier to shovel and lift the loads. Shoveling snow with a grain-type shovel or regular snow shovel can be fatiguing and can hurt the users' back if overexerted.

This ergonomic device changes the dynamics of lifting, whereby the lifter can easily change what hand height works best of two or three handle positions, to lessen back bending and back strain. The angle of the handles on the present device are in-line with the shaft, allowing use of stronger muscles under the forearm as opposed to the muscles on top of the forearm muscles used with secondary handles, that are perpendicular to the shaft (i.e., U.S. Pat. No. 5,054,830). It would also be advantageous to incorporate two handles about 3 inches to about 6 inches apart, for people of different heights or to enable one to grasp lower to throw shovel material over mounds of material.

The present device incorporates ergonomic grabbing handles (5 & 6 in FIGS. 4 & 5) parallel with the ground and just above the loaded scoop (4 in FIGS. 2 & 3), allowing for easier lifting, reducing stress on the back, and thus being truly "ergonomic." Further, this second-handle allows the user's hand to lift palm up, not knuckles up, using typically stronger muscles to lift the load. This new ergonomic second-handle can be either an add-on to existing shovels or manufactured into a new shovel, based on adding a new second-handle, in-line with the shovel shaft, positioned just above the scoop, so the person does not have to bend down to grasp and use the shovel comfortably. The new ergonomic handle design may be secured to the shovel shaft using two thumb turn type hose clamps or similar securing method, to allow the user to loosen and rotate this secondary handle into the same plane as the scoop for storage. Thus this rigid plate and multi-point connection makes the second-handle an integral part of the shovel acting as one-tool for control and comfort.

A shovel including a scoop is described herein. The shovel is one embodiment of a tool and the scoop is one embodiment of a utensil. For simplicity of this specification, the terms shovel and scoop will be used. It is to be appreciated that the embodiments described can similarly be described as a tool having a utensil.

FIG. 1 shows an isometric view with the location of the ergonomic second-handle (1a, 1b, 1c, 1d, or 1e) attached to a solid or tubular shovel shaft (2) close to the scoop (4). It is to be appreciated that the shaft (2) can be a geometry other than cylindrical.

Figure 2:
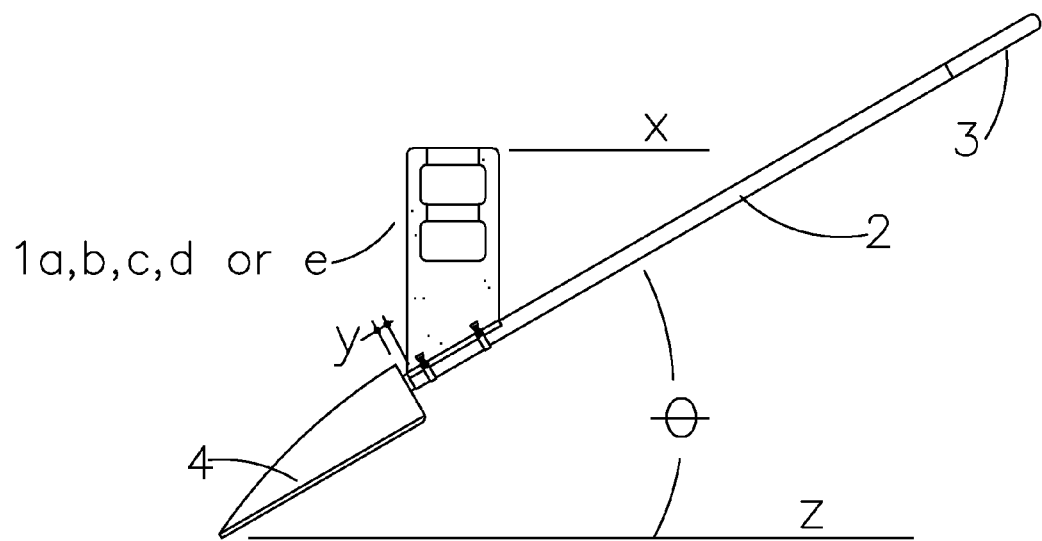
FIG. 2 shows a side elevation of the shovel with the ergonomic second-handle of FIG. 1, according to one embodiment.

FIG. 2 shows a side elevation of a typical shovel with scoop (4), shaft (2), and main handle (3), with the new ergonomic second-handle located between about 0 inches to about 3 inches (y) from the scoop (4). The top (x) of the ergonomic second-handle is shown to be parallel with the ground (z), when the shaft is at its normal use position of about 30 degrees to about 45 degrees (Θ) with respect to the ground.

Figure 3:
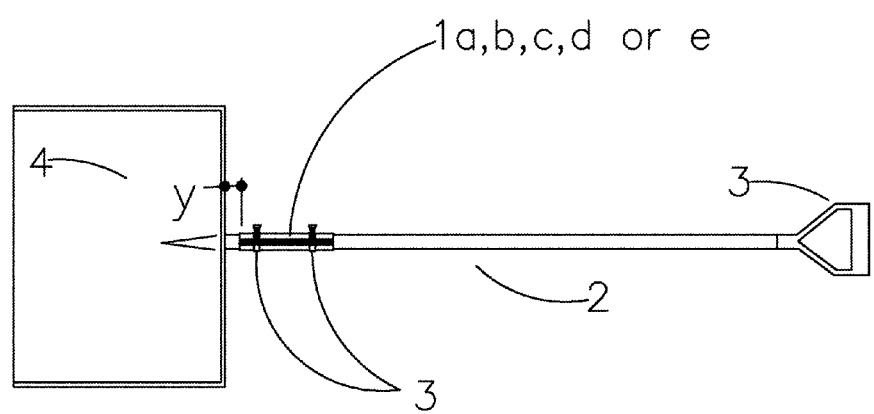
FIG. 3 shows a top-down plan view of the shovel with the ergonomic second-handle of FIG. 1, according to one embodiment.

FIG. 3 shows a top-down plan view of a typical shovel and main handle (3) with the ergonomic second-handle located on the shaft (2) and located about 0 inches to about 3 inches (y) from the scoop (4).

Figure 4:
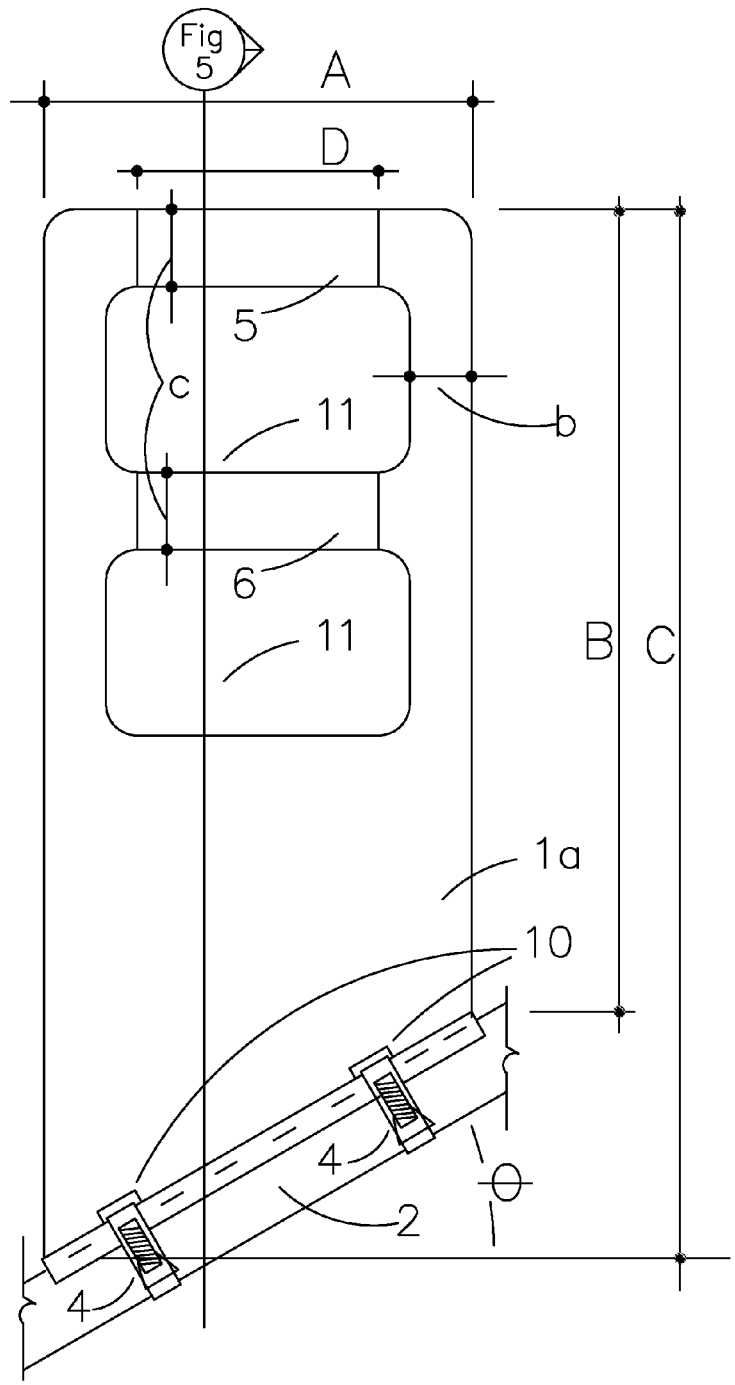
FIG. 4 shows a profile, side-view of the ergonomic second-handle of FIG. 1, according to one embodiment

FIG. 4 shows a profile, side-view of one embodiment of the ergonomic second-handle (1a) and basic parts of two grips (5, 6) and two hose clamps (4) to secure it to the shaft of a typical shovel shaft (2). The following dimensions and angles apply:

"A" dimension is between about 5 inches and about 8 inches, grips (5, 6) shown as "D" are between about 4 inches and about 5 inches "C" dimension is between about 15 inches and about 22 inches with "B" between about 10 inches and about 18 inches.

"b" dimension is between about 0.75 inches and about 1.5 inches; and "c" at grips is also the between about 0.75 inches and about 1.5 inches.

"Θ" is the angle between the shaft and ground when the shovel is used normally and thus the same angle as the bottom of the new ergonomic second-handle shown in FIG. 2.

Figure 5:
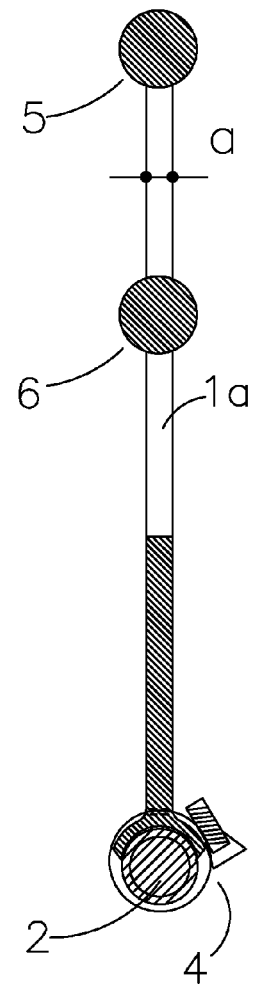
FIG. 5 shows a sectional view of the ergonomic second-handle of FIG. 1, according to one embodiment.

FIG. 5 shows a sectional view of the planar/flat ergonomic second-handle (1) and grips (5, 6), secured to the solid or tubular shaft (2) with hose-type clamps (4), or other multi-point method, to stop rotation of the handle around shaft and thus act as one with the shovel. The thickness of the second-handle "a" is between about 0.125 inches and about 0.5 inches.

Figure 6:
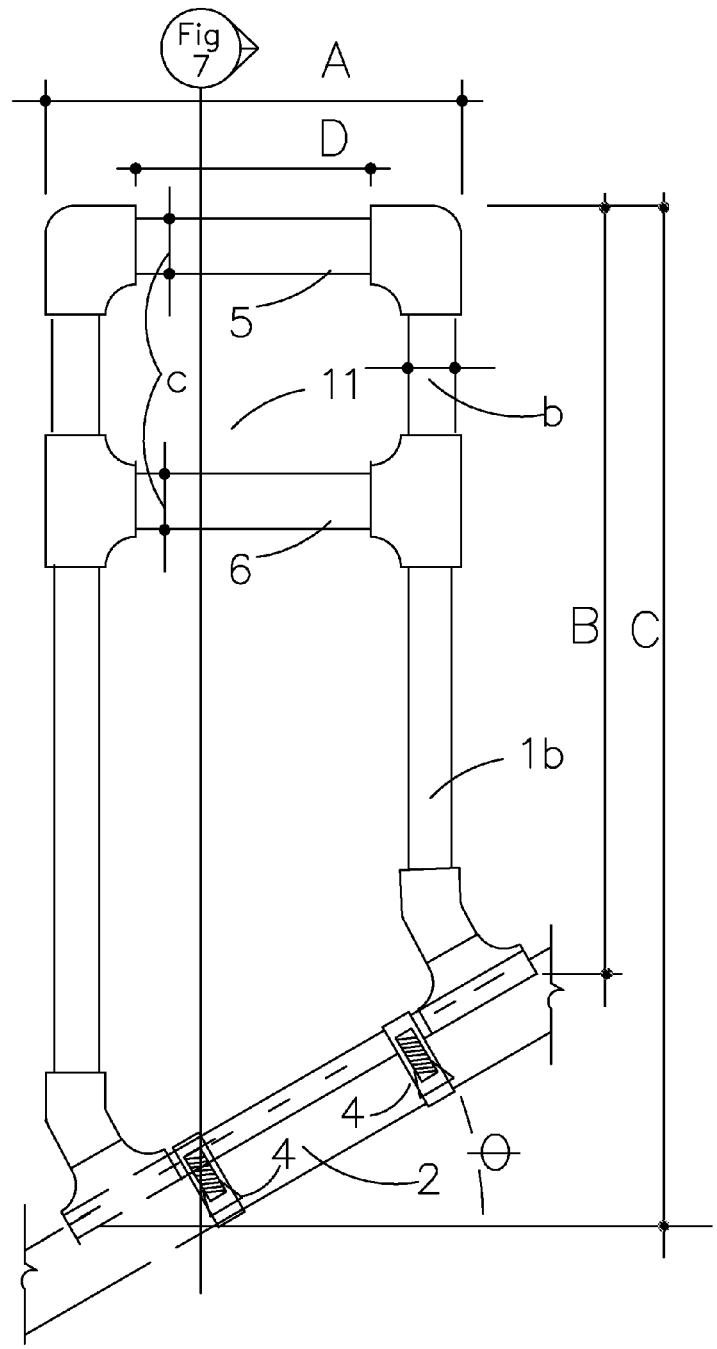
FIG. 6 shows a profile, side-view of an ergonomic second-handle according to another embodiment.

FIG. 6 shows an alternate formation (1b) of the new ergonomic second-handle, made from tubular materials with similar dimensions as with the embodiment (1a) described above.

Figure 7:
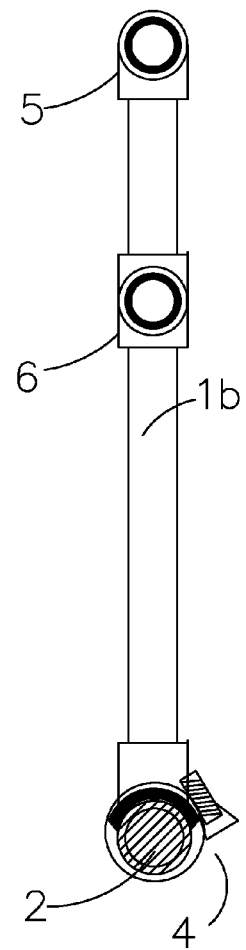
FIG. 7 shows a sectional view of the ergonomic second-handle of FIG. 6, according to one embodiment.

FIG. 7 shows a second view of the alternative second-handle (1b), of tubular materials.

FIG. 8 shows another embodiment of the ergonomic second-handle (1c) made to be adjustable with one grip (5). This adjustable version of the ergonomic second-handle utilizes a ribbed interface (7) between the two main pieces, when locked together with the knob-bolt (8) and imbedded nut (9), creates a single acting second-handle. The bottom of the second-handle is bent around the shovel shaft (2) and secured with a multi-point locks with hose-clamps (4).

FIG. 9 shows a second view of the alternative second-handle (1c) of FIG. 8.

Figure 10:
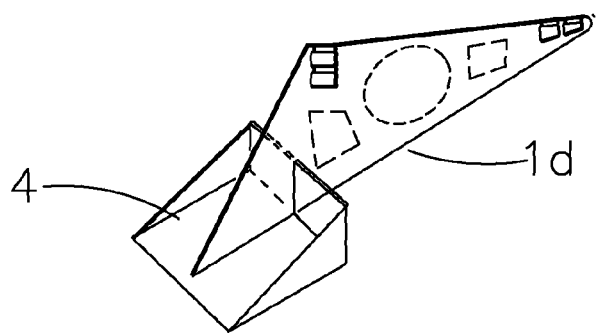
FIG. 10 shows an isometric view of an ergonomic second-handle connected to a scoop, according to another embodiment.

FIG. 10 shows an isometric view of an ergonomic second-handle (1d), according to one embodiment. The ergonomic second-handle (1d) can replace the traditional pole/shaft of a shovel. In the illustrated embodiment, the ergonomic second-handle (1d) can be a single piece, unitary construction with a shaft portion connectable to the scoop (4). The ergonomic second-handle (1d) of FIG. 10 is generally triangular in geometry. It is to be appreciated that the ergonomic second-handle (1d) could have alternative geometries within the scope of this disclosure.

Figure 11:
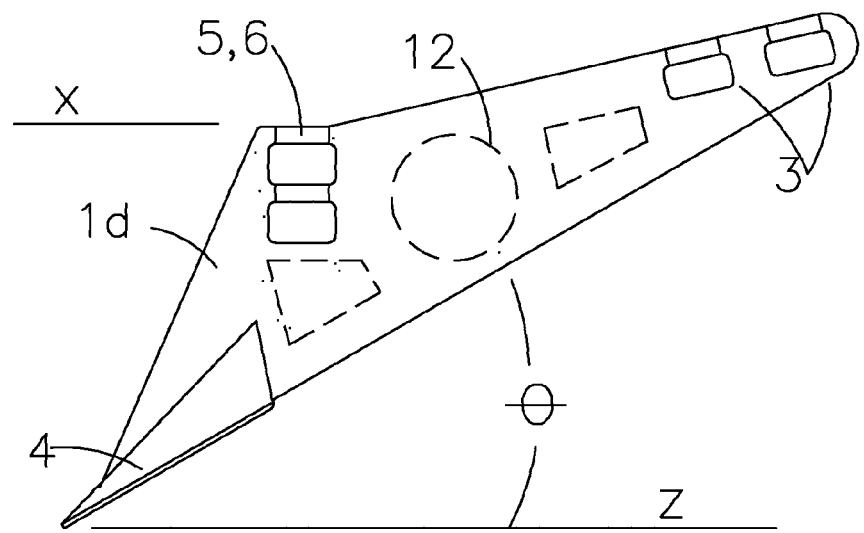
FIG. 11 shows a side-view of the ergonomic second-handle of FIG. 10, according to another embodiment.

FIG. 11 shows a side-view of the ergonomic second-handle of FIG. 10, according to another embodiment. In the illustrated embodiment, the ergonomic second-handle (1d) includes two grips (3). The ergonomic second-handle (1d) includes a cutout (12), according to one embodiment. The cutout (12) can reduce a total weight of the ergonomic second-handle (1d). It is to be appreciated that the cutout (12) can be of a geometry other than substantially circular as shown in FIG. 11. There can be a plurality of cutouts (12), or a single cutout (12).

Figure 12:
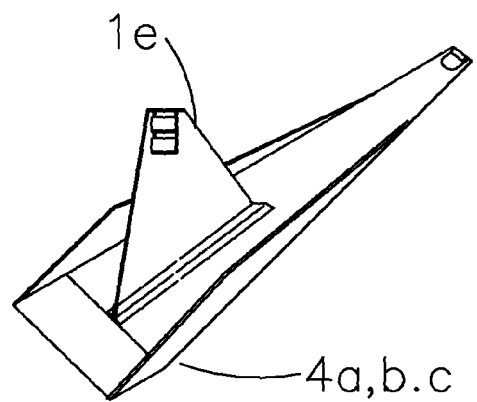
FIG. 12 shows an isometric view of an ergonomic second-handle connected to an elongated scoop, according to one embodiment.

FIG. 12 shows an isometric view of an ergonomic second-handle (1e) connected to an elongated scoop 4, according to one embodiment.

Figure 13:
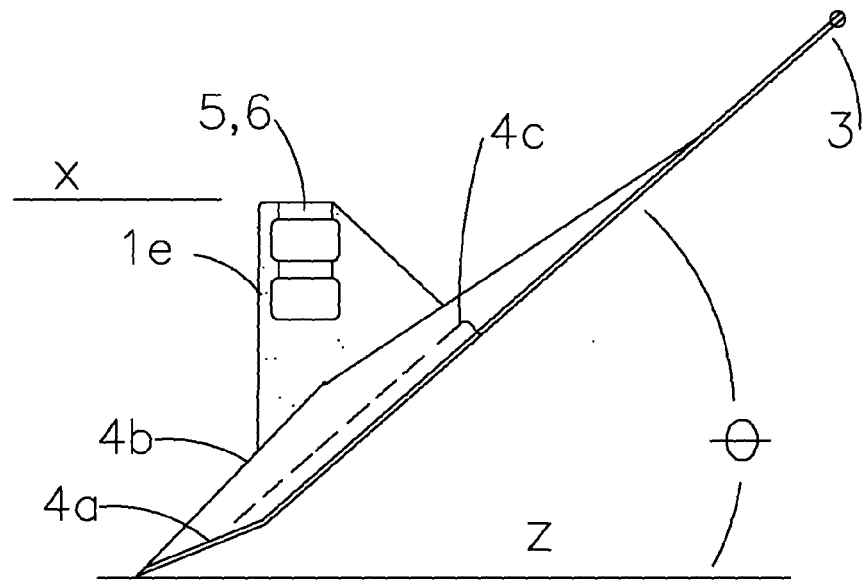
FIG. 13 shows a side-view of the ergonomic second-handle of FIG. 12, according to one embodiment.

FIG. 13 shows a side-view of the ergonomic second-handle (1e) of FIG. 12, according to one embodiment. The different parts (4a, 4b, and 4c) of the elongated scoop (4) are shown in FIG. 13. Part (4a) is the continuous bottom of the scoop (4) stretching from the front tip at the ground, up to the main handle (3). Part (4b) is the sides of the scoop (4) with part (4c) representing a center reinforcing strip. Part (4c) can provide rigidity to the scoop bottom and can provide a rigid connection to the ergonomic second-handle (1e).

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A handle configured to be detachably connected to a handle shaft of a shovel having a scoop, the handle comprising:
   a first edge having a first length;
   a second edge parallel to the first edge and having a second length, the second length being different from the first length;
   a connection edge extending continuously between the first and second edges and configured to be detachably connected to the handle shaft;
   a top edge extending between the first and second edges, wherein the handle includes an opening between the top edge and the connection edge such that the top edge is graspable, and
   a second opening between the opening and the connection edge such that a second piece of the handle is graspable, the second piece including another top edge disposed facing the opening and a bottom edge disposed facing the second opening, the another top edge being parallel to the top edge and not collinear to the top edge,
   wherein in an installed configuration:
      the first edge is disposed relatively closer to the scoop of the shovel than the second edge and the second edge is longitudinally spaced from the first edge in a direction of a longitudinal axis of the handle shaft,
      the connection edge is connected to the handle shaft, and
      a line extending along the top edge intersects the handle shaft at an angle θ.

2. The handle according to claim 1, wherein the first length is greater than the second length.

3. The handle according to claim 1, wherein the first edge and the second edge abut the handle shaft in the installed configuration.

4. The handle according to claim 1, wherein a distance between the top edge and the connection edge is variable.

5. A handle configured to be detachably connected to a handle shaft of a shovel having a scoop, the handle comprising:
   a first edge having a first length;
   a second edge parallel to the first edge and having a second length, the second length being different from the first length;
   a connection edge extending continuously between the first and second edges and configured to be detachably connected to the handle shaft; and
   a top edge extending between the first and second edges, wherein the handle includes an opening between the top edge and the connection edge such that the top edge is graspable, wherein a distance between the top edge and the connection edge is variable, and
   wherein in an installed configuration:
      the first edge is disposed relatively closer to the scoop of the shovel than the second edge and the second edge is longitudinally spaced from the first edge in a direction of a longitudinal axis of the handle shaft,
      the connection edge is connected to the handle shaft, and
      a line extending along the top edge intersects the handle shaft at an angle θ.

* * * * *